United States Patent
Lo

(10) Patent No.: US 10,331,284 B2
(45) Date of Patent: Jun. 25, 2019

(54) TOUCH-CONTROL COMMUNICATION SYSTEM AND TOUCH-CONTROL COMMUNICATION METHOD

(71) Applicant: Generalplus Technology Inc., Hsinchu (TW)

(72) Inventor: Li Sheng Lo, Zhubei (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/130,343

(22) Filed: Sep. 13, 2018

(65) Prior Publication Data
US 2019/0012020 A1 Jan. 10, 2019

Related U.S. Application Data

(63) Continuation-in-part of application No. 14/845,778, filed on Sep. 4, 2015, now abandoned.

(30) Foreign Application Priority Data

Oct. 8, 2014 (TW) .............................. 103134982 A

(51) Int. Cl.
*G06F 3/044* (2006.01)
*H04M 1/67* (2006.01)
*G06F 3/041* (2006.01)

(52) U.S. Cl.
CPC ............ *G06F 3/044* (2013.01); *G06F 3/0416* (2013.01); *H04M 1/67* (2013.01); *G06F 2203/04112* (2013.01)

(58) Field of Classification Search
CPC .... G06F 3/044; G06F 3/0416; G06F 3/03545; G06F 2203/04104; G06F 3/038; G06F 2203/04106; G06F 3/046

USPC ............ 345/173, 174, 179; 178/18.06, 19.03
See application file for complete search history.

(56) References Cited

U.S. PATENT DOCUMENTS

| | | | |
|---|---|---|---|
| 2006/0250374 A1* | 11/2006 | Morita | G06F 3/0488 345/173 |
| 2012/0105362 A1* | 5/2012 | Kremin | G06F 3/03545 345/174 |
| 2012/0139865 A1* | 6/2012 | Krah | G06F 3/044 345/174 |

(Continued)

FOREIGN PATENT DOCUMENTS

TW         I456450 B      10/2014

*Primary Examiner* — Koosha Sharifi-Tafreshi
(74) *Attorney, Agent, or Firm* — Muncy, Geissler, Olds & Lowe, P.C.

(57) ABSTRACT

A touch-control communication system and a touch control communication method are provided in the present invention. The system includes a mobile device and a data transmission device. The mobile device has a capacitive touch panel, and the capacitive touch panel emits a touch sensing signal when the capacitive touch panel senses touch. The data transmission device is configured with a transceiver antenna and a signal inverting circuit. According to the transmission data, the data transmission device determines whether or not the signal inverting circuit outputs an inversion signal to the transceiver antenna, so that the capacitive touch panel obtains a logic state of the transmission data by detecting whether or not a touch point exists. Thus, the transmission data can be transmitted to the mobile device.

17 Claims, 15 Drawing Sheets

(56) References Cited

U.S. PATENT DOCUMENTS

2012/0154340 A1* 6/2012 Vuppu ................ G06F 3/03545
  345/179
2013/0093700 A1* 4/2013 Liao ...................... G06F 3/0416
  345/173

* cited by examiner

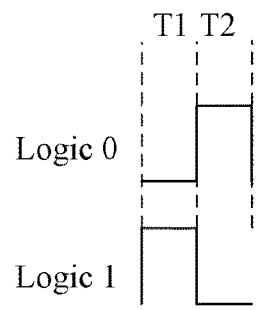
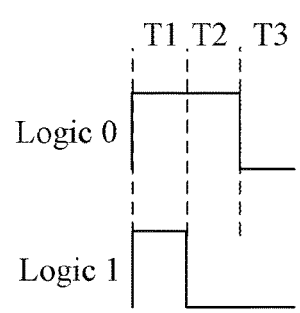
FIG. 6A          FIG. 6B
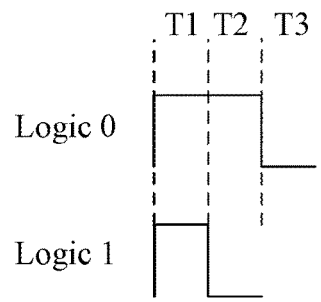
FIG. 6C
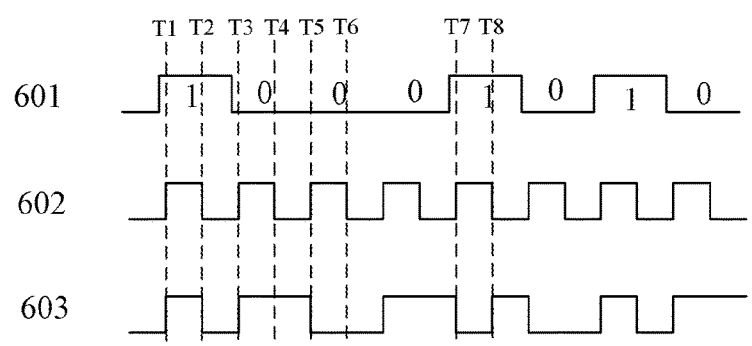
FIG. 6D

TOUCH-CONTROL COMMUNICATION SYSTEM AND TOUCH-CONTROL COMMUNICATION METHOD

CROSS REFERENCE TO RELATED APPLICATIONS

This application is a Continuation-in-Part of co-pending application Ser. No. 14/845,778, filed on Sep. 4, 2015, for which priority is claimed under 35 U.S.C. 120; and this application claims priority of Application No. 103134982 filed in Taiwan on Oct. 8, 2014 under 35 U.S.C. § 119, the entire content of which is hereby incorporated by reference.

BACKGROUND OF THE INVENTION

Field of Invention

The present invention relates in general to a capacitance sensing technology, and more particularly to a touch-control communication method for enhancing its signal-to-noise ratio (SNR) and a touch-control communication system and a capacitive touch panel using the same.

Related Art

A touch panel is a device usually attached to a liquid crystal display (LCD) or a laptop computer. It allows people to use their finger or a stylus to lightly press options on the touch panel to transmit data or read information on the screen. The touch panel has been applied extensively:

(1) On mobile information, consumer electronics and communication products, such as PDAs, tablet computers, digital cameras, information appliances, and 3G/4G mobile phones;

(2) For financial or business purposes, such as ATMs (automatic teller machines), sales management systems, remote video conferencing, and telephone terminal systems;

(3) For industrial purposes, such as factory automation control systems, central surveillance systems, and work station operating systems;

(4) For public information purposes, such as the services of guided tour, briefing, and information inquiry in public transportation systems (airports, train/bus/subway stations, and etc.) and shopping malls.

The touch panel senses in steps as follows: When a finger touches the touch panel's sensor, an analog signal is output. A controller in the touch panel converts the analog signal into a digital signal that is readable to a computer. A touch-control driver program in the computer then incorporates compilations of different elements and eventually a screen signal is output by a display card to reveal the position of touch on the screen.

FIG. 1 is a schematic drawing of a capacitive touch panel in the conventional art. Referring to FIG. 1, the capacitive touch panel is a mutual-capacitance capacitive touch panel. The touch panel includes a drive electrode 101, a reception electrode 102, and a pulse output circuit 103. The pulse output circuit 103 outputs a pulse of 3.3 volts to the drive electrode 101. The drive electrode 101 generates an electric field signal outwards. When the finger touches the capacitive touch panel, a part of the electric field is absorbed by the finger, resulting in change in the charge time and the discharge time.

With the popularization of smart phones and tablet computers, smart phones and tablet computers usually carry multi-touch screens. Meanwhile, smart phones and tablet computers are usually connected to peripheral devices via interface such as USB (universal serial bus), SD (secure digital) card, and Bluetooth. Among the above hand-held devices with touch panels, characteristics of the touch panel are not utilized for transmitting data. The Applicant provided a solution to utilizing the characteristics of the touch panel for transmitting data in Application No. TW100137547 filed on Oct. 17, 2011. However, the above technology is compromised by some shortcomings. For example, at least 3 touch points are required to communicate with the touch panel; there are certain distance limits among the 3 touch points since too short distances cannot provide enough grounding; touch panels generally provide only 10 touch points at the same time, which means there can only be 3 devices at most connected with one another simultaneously. In other words, the transmission technology for conventional hand-held devices with touch panels still has some room for improvement.

SUMMARY OF THE INVENTION

The objective of the present invention is to provide a touch-control communication system and a touch-control communication method, which utilize the touch panel as the medium via only one touch point (or two or more touch points) to transmit data to mobile devices with touch panels from the outside.

In order to achieve said objective and others, the present invention provides a touch-control communication system. The touch-control communication system includes a mobile device and a data transmission device. The mobile device includes a projective capacitive touch panel and a processing circuit. When the projective capacitive touch panel detects touch, it outputs a touch-control radio frequency detection signal. The processing circuit is coupled to the projective capacitive touch panel to receive data from the projective capacitive touch panel. The data transmission device includes a signal receiving antenna, a signal inverting circuit, a signal modulating circuit, a signal amplifying circuit, and a signal output antenna. The signal receiving antenna is used to receive the touch-control radio frequency detection signal. The signal inverting circuit includes an input end and an output end. The input end of the signal inverting circuit is coupled to the signal receiving antenna to receive the touch-control radio frequency detection signal so that the signal inverting circuit inverts the received touch-control radio frequency detection signal to output an inversion signal. The signal modulating circuit includes an input end and an output end. The input end of the signal modulating circuit is coupled to the output end of the signal inverting circuit to receive the inversion signal. The signal modulating circuit outputs a modulation signal according to a transmitted data and the inversion signal. The signal amplifying circuit includes an input end and an output end. The input end of the signal amplifying circuit is coupled to the output end of the signal modulating circuit to amplify the modulation signal output by the signal modulating circuit so as to output an amplification signal. The signal output antenna is coupled to the output end of the signal amplifying circuit to output the amplification signal.

The signal modulating circuit receives the transmitted data and determines whether or not to output the inversion signal to the signal amplifying circuit according to the transmitted data. The projective capacitive touch panel then detects the presence or absence of touch point(s) as the logic state of the transmitted data and sends the transmitted data to the processing circuit.

The present invention further provides a touch-control communication method, for transmitting a transmitted data of a data transmission device to a mobile device through a touch media, wherein the mobile device includes a projective capacitive touch panel for sensing a touch event. The touch-control communication method comprises: capturing a touch-control radio frequency detection signal from the projective capacitive touch panel; inversely amplifying the touch-control radio frequency detection signal to obtain an inversion signal; and determining whether or not the inversion signal is output to the projective capacitive touch panel according to the transmitted data, so that the projective capacitive touch panel detects whether or not a touch point exists as a logic state of the transmitted data and sends the transmitted data to the mobile device.

In the touch-control communication system and the touch-control communication method according to a preferred embodiment of the present invention, when the transmitted data is a first logic, the signal modulating circuit outputs the inversion signal during a first interval of a cycle and the signal modulating circuit outputs a first state voltage during a second interval of the cycle; and when the transmitted data is a second logic, the signal modulating circuit outputs the first state voltage during the first interval of the cycle and the signal modulating circuit outputs the inversion signal during the second interval of the cycle, wherein the first interval plus the second interval equals the cycle.

In the touch-control communication system and the touch-control communication method according to a preferred embodiment of the present invention, when the transmitted data is a first logic, the signal modulating circuit outputs the inversion signal during a former first time period of a cycle and then outputs a first state voltage, and when the transmitted data is a second logic, the signal modulating circuit outputs the inversion signal during a second time period of the cycle and then outputs the first state voltage, the first time period not equal to the second time period.

In the touch-control communication system and the touch-control communication method according to a preferred embodiment of the present invention, when the transmitted data is a first logic, the signal modulating circuit outputs the inversion signal during a former first time period and then outputs a first state voltage during a second time period, and when the transmitted data is a second logic, the signal modulating circuit outputs the inversion signal during a former third time period and then outputs the first state voltage during the second time period, wherein the first time period is not equal to the third time period.

In the touch-control communication system and the touch-control communication method according to a preferred embodiment of the present invention, the modulation signal has a first state and a second state. When the transmitted data is a first logic and the modulation signal is the first state, the modulation signal is the second state during a first interval of a cycle and then the modulation signal is the first state during a second interval of the cycle. When the transmitted data is the first logic and the modulation signal is the second state, the modulation signal is the first state during the first interval of the cycle and then the modulation signal is the second state during the second interval of the cycle. When the transmitted data is the second logic and the modulation signal is the first state, the modulation signal is the second state during the first interval and the second interval of the cycle. When the transmitted data is the second logic and the modulation signal is the second state, the modulation signal is the first state during the first interval and the second interval of the cycle, wherein the first interval plus the second interval equals the cycle, the first state is "the signal modulating circuit outputting the inversion signal" and the second state is "the signal modulating circuit outputting the first state voltage."

The spirit of the present invention is to utilize the antenna to receive the touch-control radio frequency detection signal output by the projective capacitive touch panel and determine whether or not to invert said touch-control radio frequency detection signal according to the logic state of the transmitted data and then send back the inverted touch-control radio frequency detection signal to the projective capacitive touch panel so that the projective capacitive touch panel senses the touch point. Thus, the projective capacitive touch panel can detect the presence or absence of the touch point so as to determine the logic state of the data transmitted via the touch panel.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 6A schematically shows the Manchester encoding used in the signal modulating circuit 403 of a touch-control communication system according to a preferred embodiment of the present invention.

FIG. 6B schematically shows the pulse width modulation (PWM) encoding used in the signal modulating circuit 403 of the touch-control communication system according to a preferred embodiment of the present invention.

FIG. 6C schematically shows the pulse position modulation (PPM) encoding used in the signal modulating circuit 403 of the touch-control communication system according to a preferred embodiment of the present invention.

FIG. 6D schematically shows the bi-phase encoding used in the signal modulating circuit 403 of the touch-control communication system according to a preferred embodiment of the present invention.

DETAILED DESCRIPTION OF THE INVENTION

The present invention will be apparent from the following detailed description, which proceeds with reference to the accompanying drawings, wherein the same references relate to the same elements.

Figure 1:
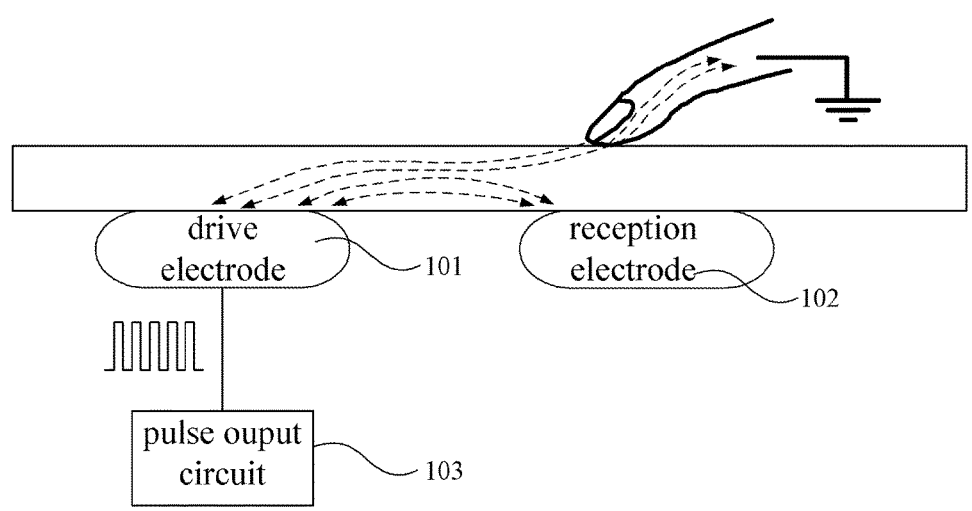
FIG. 1 schematically shows a capacitive touch panel in the conventional art.
Figure 2:
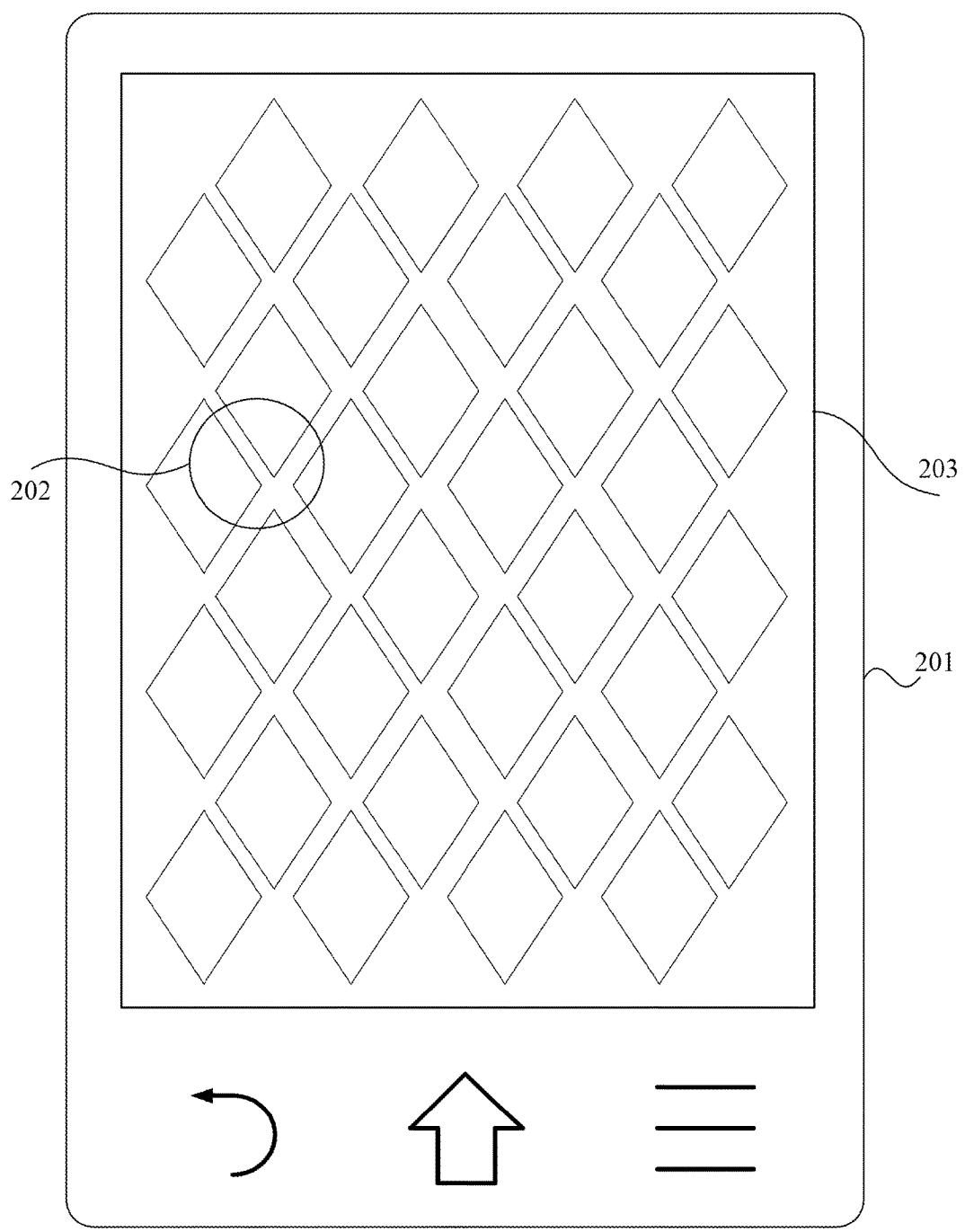
FIG. 2 schematically shows a touch-control communication system according to a preferred embodiment of the present invention.

FIG. 2 schematically shows a touch-control communication system according to a preferred embodiment of the present invention. Referring to FIG. 2, the touch-control communication system includes a mobile device 201 and a data transmission device 202. The data transmission device 202 is disposed on a projective capacitive touch panel 203 of the mobile device 201. The projective capacitive touch panel 203 is mainly used to receive touch points made by the user's fingers or other objects. A processing circuit (not shown) in the mobile device 201 can then decode data transmitted by the data transmission device 202 through a certain interior application.

Figure 3:
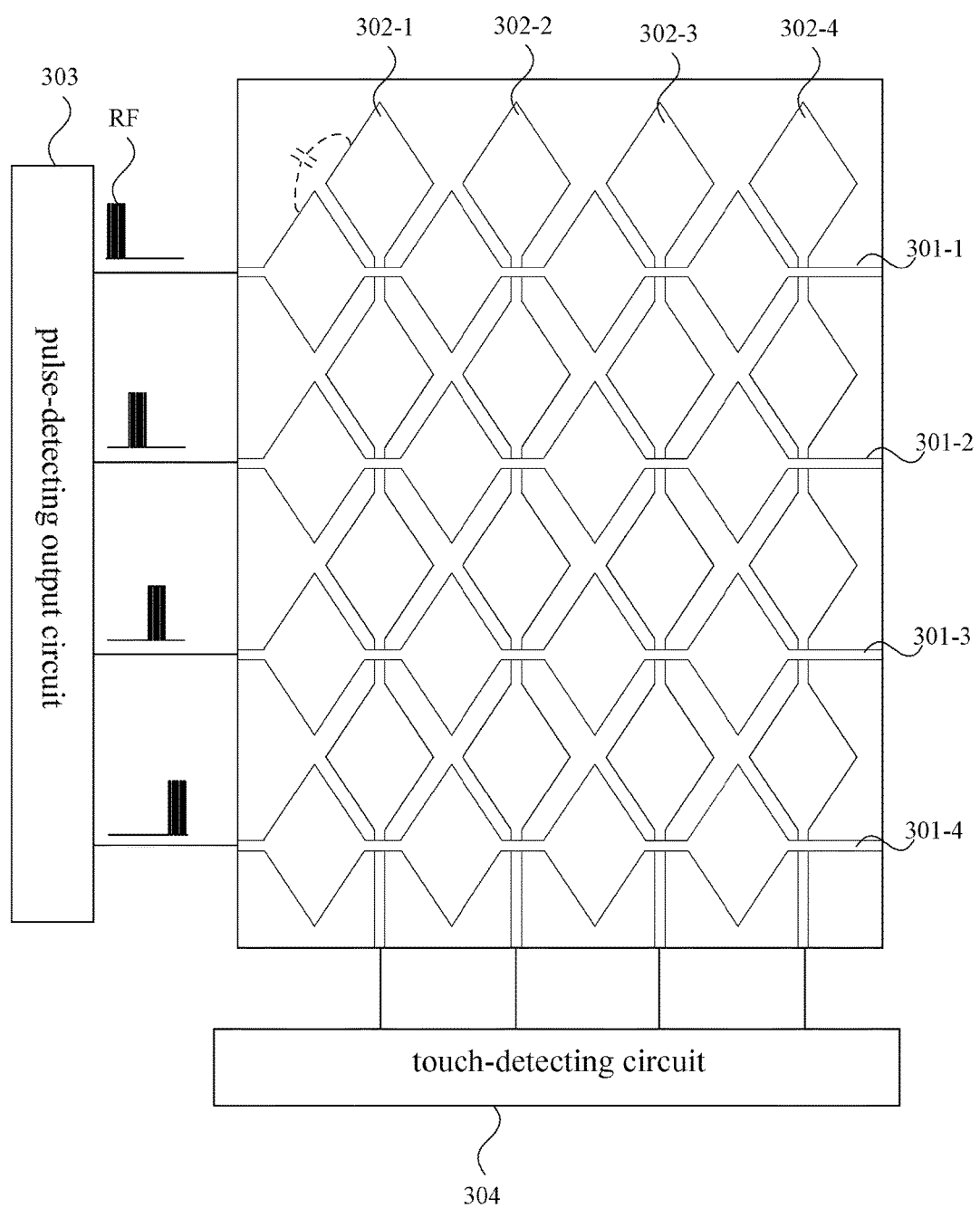
FIG. 3 is the circuit diagram of a projective capacitive touch panel 203 in a touch-panel communication system according to a preferred embodiment of the present invention.

FIG. 3 is the circuit diagram of a projective capacitive touch panel 203 in a touch-panel communication system according to a preferred embodiment of the present invention. Referring to FIG. 3, generally the projective capacitive touch panel 203 includes a pulse-detecting output circuit 303, a touch-detecting circuit 304, X-axis induction electrodes 301-1~301-4, and Y-axis induction electrodes 302-1~302-4. The X-axis induction electrodes 301-1~301-4 would sequentially receive a touch-control radio frequency detection signal RF emitted by the pulse-detecting output circuit 303. If the user touches the intersection between the X-axis induction electrode 301-3 and the Y-axis induction electrode 302-2, when the X-axis induction electrode 301-3 emits the touch-control radio frequency detection signal RF, the user's finger would absorb the emitted touch-control radio frequency detection signal RF such that the touch-detecting circuit 304 coupled with the Y-axis induction electrode 302-2 cannot detect an electric field of the touch-control radio frequency detection signal RF, nor can it detect the attenuated touch-control radio frequency detection signal RF. At the time, the mobile device 201 can determine the intersection between the X-axis induction electrode 301-3 and the Y-axis induction electrode 302-2 was touched.

Figure 4:
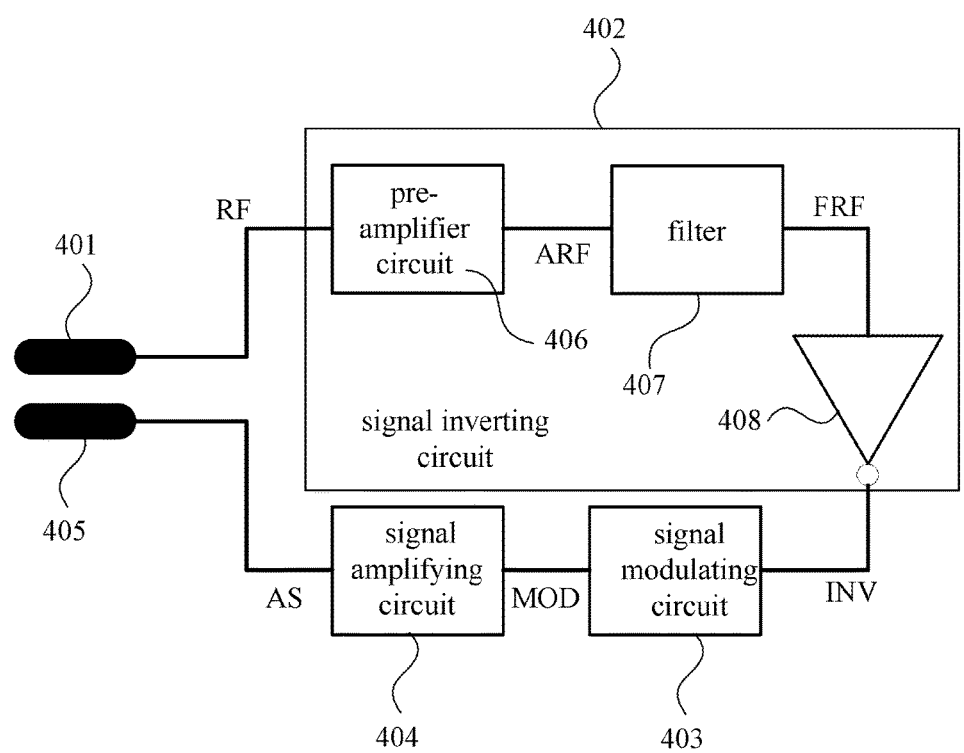
FIG. 4 shows the circuit diagram of a data transmission device 202 in a touch-control communication system according to a preferred embodiment of the present invention.

FIG. 4 shows the circuit diagram of a data transmission device 202 in a touch-control communication system according to a preferred embodiment of the present invention. Referring to FIG. 4, in the present embodiment, the data transmission device 202 includes a signal receiving antenna 401, a signal inverting circuit 402, a signal modulating circuit 403, a signal amplifying circuit 404, and a signal output antenna 405. The signal receiving antenna 401 is used to receive the touch-control radio frequency detection signal RF. The input end of the signal inverting circuit 402 is coupled to the signal receiving antenna 401 to receive the touch-control radio frequency detection signal RF so as to invert the received touch-control radio frequency detection signal RF to output an inversion signal INV. The input end of the signal modulating circuit 403 is coupled to the output end of the signal inverting circuit 402 to receive the inversion signal INV. The signal modulating circuit 403 outputs a modulation signal MOD according to a transmitted data DATA and the inversion signal INV. The input end of the signal amplifying circuit 404 is coupled to the output end of the signal modulating circuit 403 to amplify the modulation signal MOD output by the signal modulating circuit 403 so as to output an amplification signal AS. The signal output antenna 405 is coupled to the output end of the amplifying circuit 404 to output the amplification signal AS.

Further, in the present embodiment, the signal inverting circuit 402 includes a pre-amplifier circuit 406, a filter 407, and an inverter 408. Generally speaking, the touch-control radio frequency detection signal RF received by the signal receiving antenna 401 is weaker; after being amplified by the pre-amplifier circuit 406, the touch-control radio frequency detection signal RF is easier to process. The filter 407 is used to filter a pre-amplified touch-control radio frequency detection signal ARF, eliminate noise, and then obtain a filter signal FRF. The inverter 408 is used to invert the filter signal FRF.

Figure 5:
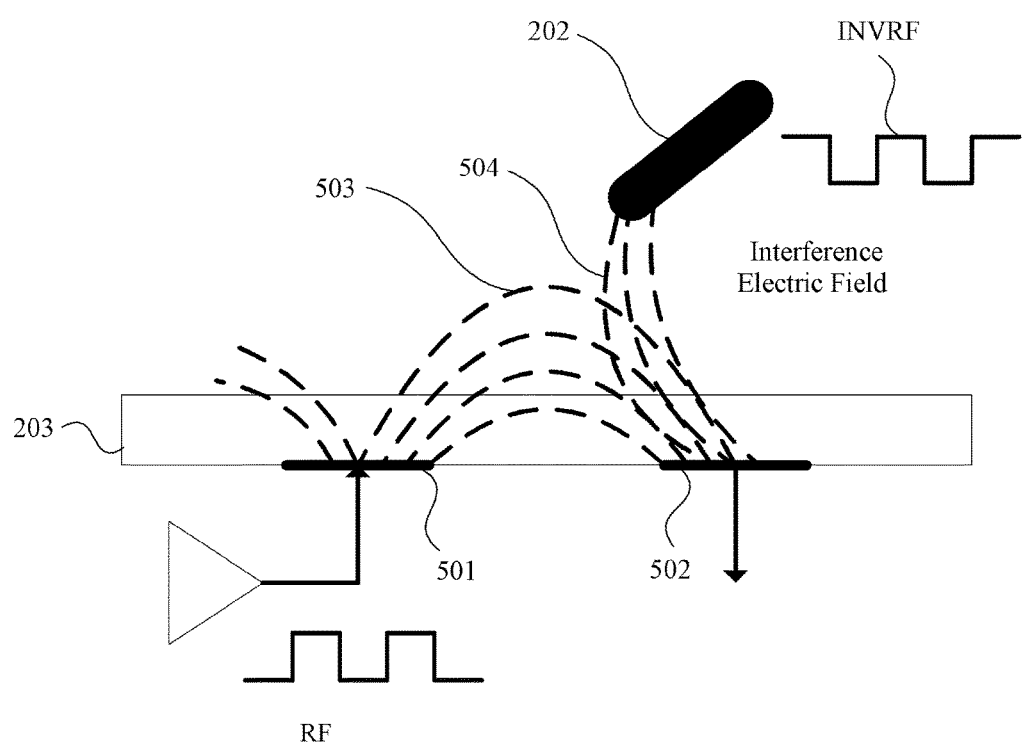
FIG. 5 schematically shows the operating principles of a touch-control communication system according to a preferred embodiment of the present invention.

FIG. 5 schematically shows the operating principles of a touch-control communication system according to a preferred embodiment of the present invention. Referring to FIG. 5, an X-axis induction electrode 501 of the projective capacitive touch panel 203 receives the touch-control radio frequency detection signal RF and projects an electric field signal 503 according to the touch-control radio frequency detection signal RF. When the data transmission device 202 is close to or disposed on the projective capacitive touch panel 203, the signal receiving antenna 401 of the data transmission device 202 would receive the electric field signal 503 of the touch-control radio frequency detection signal RF. Meanwhile, the data transmission device 202 inverts the electric field signal 503 to output an inverted touch-control radio frequency detection signal INVRF. After the inverted touch-control radio frequency detection signal INVRF is output via the signal output antenna 405, the data transmission device 202 projects an inverting electric field signal 504 (to interfere with the electric field). Thus, a Y-axis induction electrode 502 is interfered by the inverting electric field signal 504. It turns out that the touch-detecting circuit 304 coupled to the Y-axis induction electrode 502 cannot detect the electric field signal of the touch-control radio frequency detection signal RF or the attenuated touch-control radio frequency detection signal RF. At this point, the projective capacitive touch panel 203 of the mobile device 201 can determine it was touched. In the present invention, the projective capacitive touch panel 203 detects the presence or absence of touch resulted from the data transmission device 202 and thereby obtains the data transmitted by data transmission device 202.

FIGS. 6A-6D show the encoding methods used in the present invention. FIG. 6A schematically shows the Manchester encoding used in the signal modulating circuit 403 of a touch-control communication system according to a preferred embodiment of the present invention. Referring to FIG. 6A, when the transmitted data DATA is logic 0, the modulation signal MOD output by the signal modulating circuit 403 would render the projective capacitive touch panel 203 unable to sense the touch point at a T1 time. Afterwards, at a second time T2, the modulation signal MOD output by the signal modulating circuit 403 would enable the projective capacitive control panel 203 to sense the touch point. When the transmitted data DATA is logic 1, the modulation signal MOD output by the signal modulating circuit 403 would enable the projective capacitive touch panel 203 to sense the touch point during the time T1. Next, during the time T2, the modulation signal MOD output by the signal modulating circuit 403 would render the projective capacitive touch panel 203 unable to sense the touch point.

FIG. 6B schematically shows the pulse width modulation (PWM) encoding used in the signal modulating circuit 403 of the touch-control communication system according to a preferred embodiment of the present invention. Referring to FIG. 6B, this encoding method determines the width of a pulse (the period of a duty cycle) according to the logic of the data. When the transmitted data DATA is logic 0, the modulation signal MOD output by the signal modulating circuit 403 would enable the projective capacitive touch panel 203 to sense the touch point at the times T1 and T2. Later, during a time T3, the modulation signal MOD output by the signal modulating circuit 403 would render the projective capacitive touch panel 203 unable to sense the touch point. When the transmitted data DATA is logic 0, the modulation signal MOD output by the signal modulating circuit 403 would enable the projective capacitive control panel 203 to sense the touch point. Afterwards, during the times T2 and T3, the modulation signal MOD output by the signal modulating circuit 403 would render the projective capacitive touch panel 203 unable to sense the touch point.

FIG. 6C schematically shows the pulse position modulation (PPM) encoding used in the signal modulating circuit 403 of the touch-control communication system according to a preferred embodiment of the present invention. Referring to FIG. 6C, this encoding method determines the position of a pulse according to the logic state of the data. This embodiment takes a pulse with logic low-voltage for an example. When the transmitted data DATA is logic 0, the modulation signal MOD output by the signal modulating circuit 403 would enable the projective capacitive touch panel 203 to sense the touch point during the times T1 and T2. Next, during the time T3, the modulation signal MOD output by the signal modulating circuit 403 would render the projective capacitive touch panel 203 unable to sense the touch point. When the transmitted data DATA is logic 0, the modulation signal MOD output by the signal modulating circuit 403 would enable the projective capacitive touch panel 203 to sense the touch point during the time T1. Afterwards, during the time T2, the modulation signal MOD output by the signal modulating circuit 403 would render the projective capacitive touch panel 203 unable to sense the touch point.

FIG. 6D schematically shows the bi-phase encoding used in the signal modulating circuit 403 of the touch-control communication system according to a preferred embodiment of the present invention. Referring to FIG. 6D, 601 is the waveform of an originally transmitted data DATA; 602 is the waveform a clock signal; 603 is the waveform of a modulated modulation signal. It can be seen from the above that the rule of the modulation signal is that during a sampling time of every lock signal (in the present embodiment, positive-edge trigger), whether the data is logic 1 or logic 0, the state of the modulation signal would be different from that of the previous modulation signal. When the data is logic 1 and the previous state of the modulation signal 603 is logic low-voltage, the modulation signal 603 would first convert to logic high-voltage during T1 and convert to logic low-voltage during T2. When the data is logic 0 and the previous state of the modulation signal 603 is logic low-voltage, the modulation signal 603 would first convert to logic high-voltage during T3 and maintain at logic high-voltage during T4. When the data is logic 0 and the previous state of the modulation signal 603 is logic high-voltage, the modulation signal 603 would first convert to logic low-voltage during T5 and maintain at logic low-voltage during T6. When the data is logic 1 and the previous state of the modulation signal 603 is logic high-voltage, the modulation signal 603 would first convert to logic low-voltage during T7 and convert to logic high-voltage during T8.

When the modulation signal 603 is logic high-voltage, it means that the projective capacitive touch panel 203 senses the touch point. When the modulation signal 603 is logic low-voltage, it means that the projective capacitive touch panel 203 does not sense the touch point. Thus, corresponding applications inside the mobile device 201 can determine whether or not the data transmission device 202 transmits data to the mobile device 201 by detecting and decoding the presence or absence of the touch point.

Figure 7:
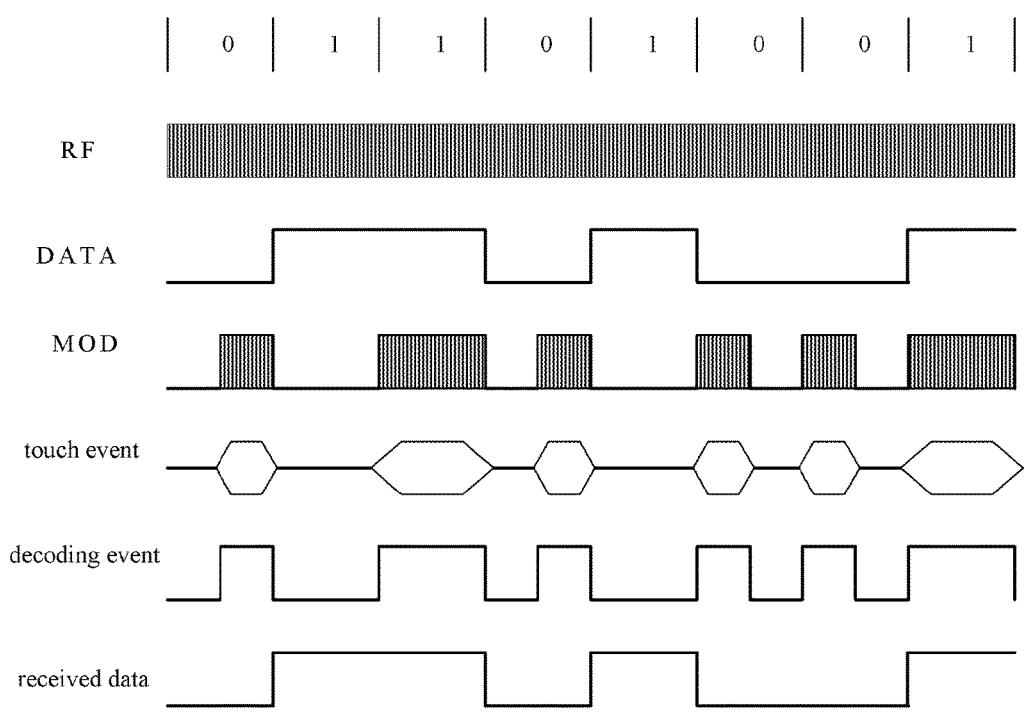
FIG. 7 shows the oscillogram of the bi-phase encoding used in the signal modulating circuit 403 of the touch-control communication system according to a preferred embodiment of the present invention.

FIG. 7 shows the oscillogram of the bi-phase encoding used in the modulating circuit 403 of the touch-control communication system according to a preferred embodiment of the present invention. In the embodiment of the present invention, the touch-control radio frequency detection signal RF is emitted by the projective capacitive touch panel 203. The touch-control radio frequency detection signal RF is received via an antenna by the data transmission device 202 and modulated according to the logic state of the transmitted data DATA, and then the modulation signal MOD is output. The impulse of the modulation signal MOD is in opposite phase to the touch-control radio frequency detection signal RF; therefore the electric field of touch-control is interfered, triggering a touch-control event. The mobile device 201 decodes and reads the above touch-control event with interior processing circuits (e.g. central processing unit, CPU) and application procedures to obtain a decoding event. Afterwards, through the interior processing circuits (e.g. CPU) and application procedures the mobile device 201 further converts the decoding event into receiving data. In addition, in the present embodiment, the way logic 1 and logic 0 are modulated is opposite to the way logic 1 and logic 0 are modulated as disclosed in FIG. 6C. People ordinarily skilled in the art should know that one may choose different ways to modulate. Therefore, the present invention is not limited to the description herein.

Figure 8A:
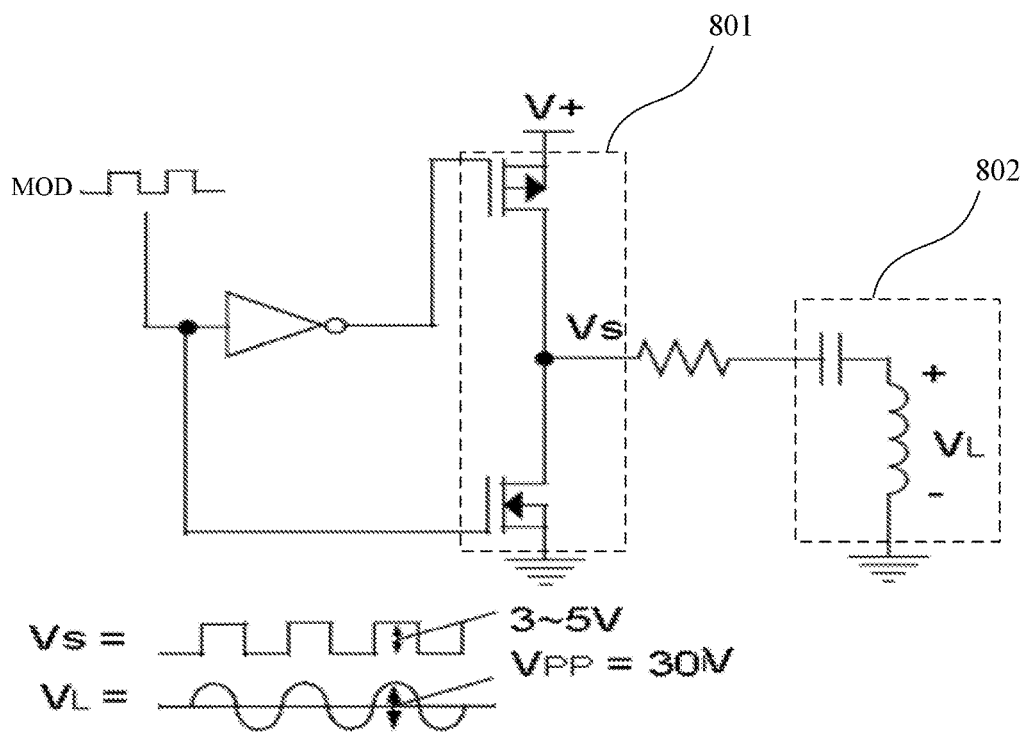
FIG. 8A shows the circuit diagram of a signal amplifying circuit 404 in a touch-control communication system according to a preferred embodiment of the present invention.
Figure 8B:
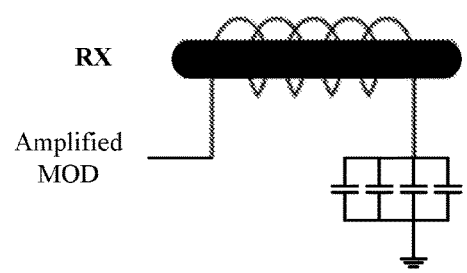
FIG. 8B shows the circuit diagram of a signal receiving antenna 401 and the signal output antenna 405 in the touch-panel communication system according to a preferred embodiment of the present invention.

FIG. 8A shows the circuit diagram of a signal amplifying circuit 404 in a touch-control communication system according to a preferred embodiment of the present invention. FIG. 8B shows the circuit diagram of a signal receiving antenna 401 and the signal output antenna 405 in the touch-panel communication system according to a preferred embodiment of the present invention. Referring to FIG. 8A, the modulation signal MOD is converted into square wave via a half-bridge circuit 801 and output to a resonant circuit 802 for resonation so that the modulation signal MOD is converted from a signal having an amplitude of 3-5 volts originally to a sine wave signal having an amplitude of 30 volts. Moreover, referring to FIG. 8B, a receiving antenna RXA is of metal and may be a metal wire. The modulation signal MOD is resonated through an inductance capacitance LC and its voltage is thereby increased. Since frequencies of the touch-control radio frequency detection signal RF for different touch panels vary, a plurality of sets of capacitance may be required to adjust to proper resonance frequencies. Alternatively, a low-quality wide bandwidth inductance capacitance resonant circuit may be made. Further, it is seen from FIGS. 8A and 8B that the coil of the resonant circuit 802 may serve as the signal output antenna 405, and the coupling relationship between the capacitance and the coil may be reversed. People ordinarily skilled in the art should have such understanding; further description in detail is thus omitted. The present invention is not limited to the description herein.

Figure 9:
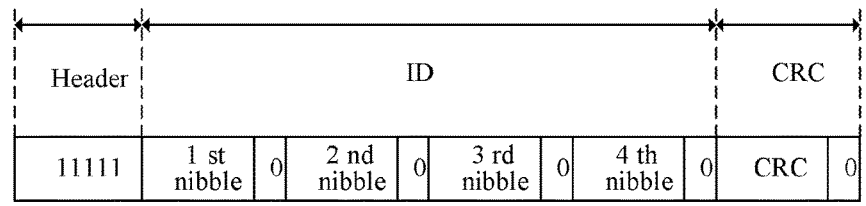
FIG. 9 shows the packet format of a transmitted data in a touch-control communication system according to a preferred embodiment of the present invention.

FIG. 9 shows the packet format of a transmitted data in a touch-control communication system according to a preferred embodiment of the present invention. Referring to FIG. 9, the packet format of the transmitted data includes a header column, an ID column, and a cyclic redundancy check (CRC) column. In the present embodiment, the head column has five logic 1 grouped as a head bit. In the ID column, every 4 bits (nibble) are a group, and every group has a logic 0 as the ending bit, altogether 4 groups in the column. The cyclic redundancy check column adopts the multinomial check, for example $f(x)=x^3+x+1$.

Take the touch panel of an IPHONE (smart-phone) or IPAD (tablet computer) for example. Its report rate is 120 Hz. Calculated according to the report rate of 120 Hz, an event time (the time for detecting touch) is $(1/120\,\text{Hz})\times 4=33$ ms. After conversion, the touch panel of an IPHONE or IPAD can receive 30 bits per second; the packet format in the present embodiment is exactly 30 bits. In other words, the data rate of the present embodiment is 16 bits per second.

Figure 10:
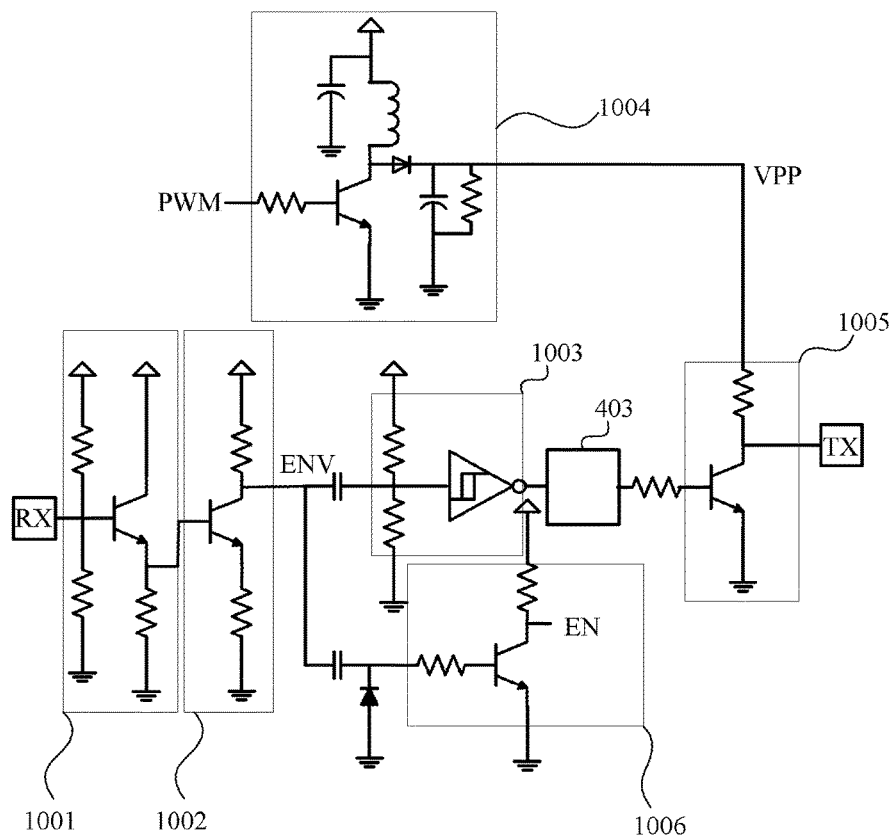
FIG. 10 shows the detailed circuit diagram of the data transmission device 202 in a touch-control communication system according to a preferred embodiment of the present invention.

FIG. 10 shows the detailed circuit diagram of the data transmission device 202 in the touch-control communication system according to a preferred embodiment of the present invention. Referring to FIG. 10, the data transmission device 202 includes an impedance-matching circuit 1001, a pre-amplifier circuit 1002, a comparator circuit 1003, a boost converter circuit 1004, an output stage amplifier circuit 1005, an enabling circuit 1006, a signal-receiving antenna RX, a signal output antenna TX, and the signal modulating circuit 403. The impedance-matching circuit 1001 is implemented with an emitter follower. The emitter follower is mainly used to do impedance-matching with the signal-receiving antenna RX. The pre-amplifier circuit 1002 is implemented with a common emitter amplifier. The comparator circuit 1003 and the above common emitter amplifier 1002 consist of the signal inverting circuit 402. The boost converter circuit 1004 is used to provide the output stage amplifier circuit 1005 a peak voltage VPP so as to elevate the swing of signals output by the output stage amplifier circuit 1005.

The enabling circuit 1006 is disposed as such mainly to reduce the power consumption of the data transmission device 202. The enabling circuit 1006 receives a packet message ENV output by the pre-amplifier circuit 1002. Whenever a packet is input to the enabling circuit 1006, an enabling signal EN output by the enabling circuit 1006 is enabled. In the present embodiment, the enabling signal EN may be used to control whether or not the signal modulating circuit 403, the comparator circuit 1003, or the boost converter circuit 1004 operates. When the data transmission device 202 is not disposed on the projective capacitive touch panel 203, the signal-receiving antenna RX cannot receive any signals, the packet signal ENV has no packets, and the enabling signal EN output by the enabling circuit 1006 is in a disabled state. At this moment, the signal modulating circuit 403 and the boost converter circuit 1004 are not enabled. When the data transmission device 202 is disposed on the projective capacitive touch panel 203, the signal receiving antenna RX can receive the touch-control radio frequency detection signal RF, the enabling circuit 1006 receives the packet signal ENV with packets, and the enabling signal EN output by the enabling circuit 1006 is enabled. The signal modulating circuit 403 and the boost converter circuit 1004 are thereby enabled. Thus, the data transmission device 202 achieves the result of saving electricity.

In the previous embodiment, the signal amplifying circuit 404 is implemented with a resonant circuit and a half-bridge circuit. In the present embodiment, the signal amplifying circuit 404 is implemented with the boost converter circuit 1004 and the output stage amplifier circuit 1005. However, the present invention is not limited to the description herein.

Figure 11:
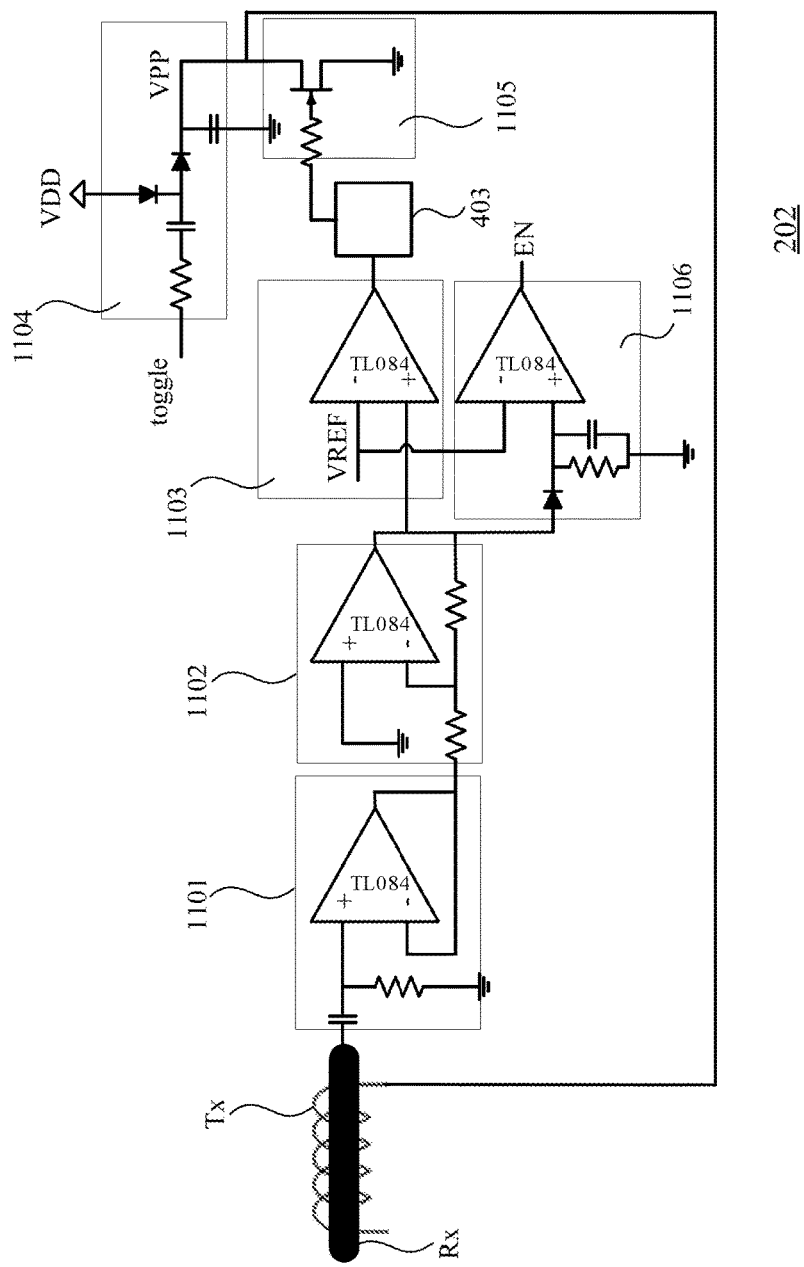
FIG. 11 shows the detailed circuit diagram of the data transmission device 202 according to a preferred embodiment of the present invention.

FIG. 11 shows the detailed circuit diagram of the data transmission device 202 according to a preferred embodiment of the present invention. Referring to FIG. 11, the data transmission device 202 includes an impedance-matching circuit 1101, a pre-amplifier circuit 1102, a comparator circuit 1103, a voltage doubler circuit 1104, an output stage amplifier circuit 1105, an enabling circuit 1106, a signal receiving antenna RX, a signal output antenna TX, and the signal modulating circuit 403. The amplifier TL084 manufactured by Texas Instruments along with exterior circuits are mainly used to implement the present embodiment. The impedance-matching circuit 1101 is implemented by using said amplifier TL084 of Texas Instruments as a buffer to do impedance matching with the signal receiving antenna RX. The pre-amplifier circuit 1102 is implemented with an inverter amplifier consisted of the amplifier TL084 and the resistance. The comparator circuit 1103 is implemented with a comparator consisted of the amplifier TL084 and a reference voltage VREF. The comparator circuit 1103 and the pre-amplifier circuit 1102 form the signal inverting circuit 402. The voltage doubler circuit 1104 is used to double an original power voltage VDD so as to provide the output stage amplifier circuit 1105 a peak voltage VPP so that the swing of the signal output by the output stage amplifier circuit 1105 is increased. The enabling circuit 1106 is disposed as such mainly to reduce the power consumption of the data transmission device 202. Since the enabling circuit 1106 and the enabling circuit 1006 as shown in FIG. 10 function similarly, further description is therefore omitted herein.

In the previous embodiment, the signal amplifying circuit 404 is implemented with the boost converter circuit 1004 along with the output stage amplifier circuit 1005. In the present embodiment, the signal amplifying circuit 404 is implemented with the voltage doubler circuit 1104 along with the output stage amplifier circuit 1105. However, the present invention is not limited to the description herein.

Figure 12:
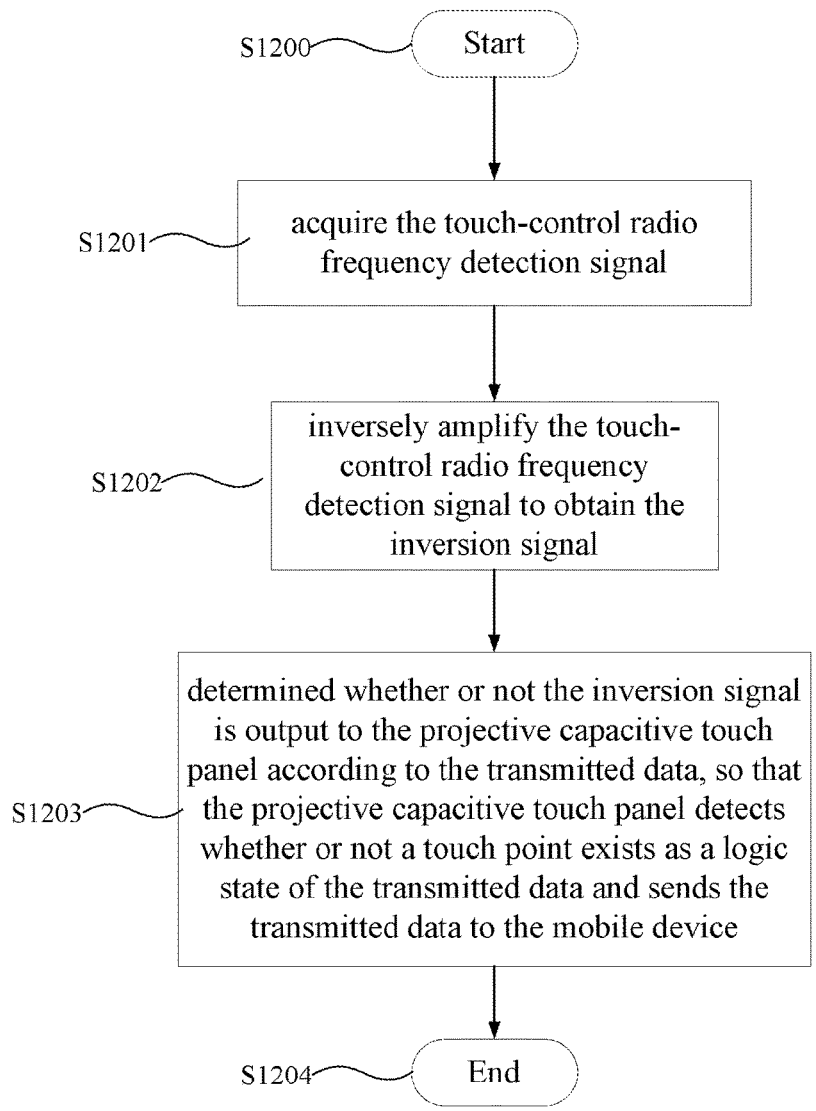
FIG. 12 shows a flowchart of a touch-control communication method according to a preferred embodiment of the present invention.

According to the abovementioned embodiments, a touch-control communication method can be summarized. FIG. 12 shows a flowchart of a touch-control communication method according to a preferred embodiment of the present invention. Referring to FIG. 12, the touch-control communication method is used for transmitting a transmitted data DATA of a data transmission device 202 to a mobile device 201 through a touch media, such as the projective capacitive touch panel 203. The touch-control communication method includes the steps as follows.

In step S1200, the method starts.

In step S1201, a touch-control radio frequency detection signal RF is acquired from the projective capacitive touch panel 203.

In step S1202, the touch-control radio frequency detection signal RF is inversely amplified to obtain an inversion signal INVRF.

In step S1203, it is determined whether or not the inversion signal INVRF is output to the projective capacitive touch panel 203 according to the transmitted data DATA, so that the projective capacitive touch panel 203 detects whether or not a touch point exists as a logic state of the transmitted data DATA and sends the transmitted data DATA to the mobile device 201.

In step S1204, the method ends.

In the abovementioned embodiment, the step S1203 can be implemented by Manchester encoding, PWM encoding, PPM encoding or Bi-Phase encoding.

Figure 13:
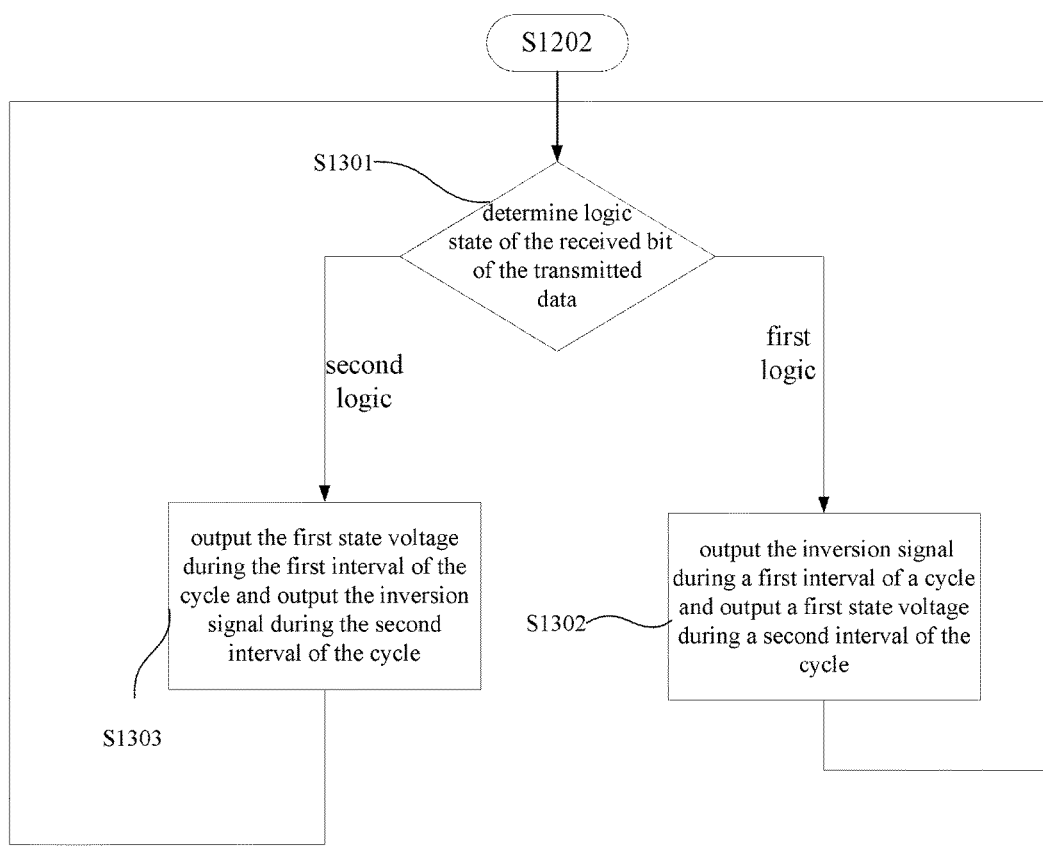
FIG. 13 shows the sub-steps of the step S1203 of the flowchart of a touch-control communication method by Manchester encoding according to a preferred embodiment of the present invention.

FIG. 13 shows the sub-steps of the step S1203 of the flowchart of a touch-control communication method by Manchester encoding according to a preferred embodiment of the present invention. Referring to FIG. 13, the step S1203 includes the steps as follows.

In step S1301, it is determined the logic state of the received bit of the transmitted data. When the transmitted data is first logic, the step S1302 is performed. When the transmitted data is second logic, the step S1303 is performed. Similarly, the designer can selectively design that the first logic is logic 1 and the second logic is logic 0 or the first logic is logic 0 and the second logic is logic 1. The detail description is omitted.

In step S1302, when the transmitted data is a first logic, outputting the inversion signal during a first interval of a cycle and outputting a first state voltage during a second interval of the cycle.

In step S1303, when the transmitted data is a second logic, outputting the first state voltage during the first interval of the cycle and outputting the inversion signal during the second interval of the cycle.

Figure 14:
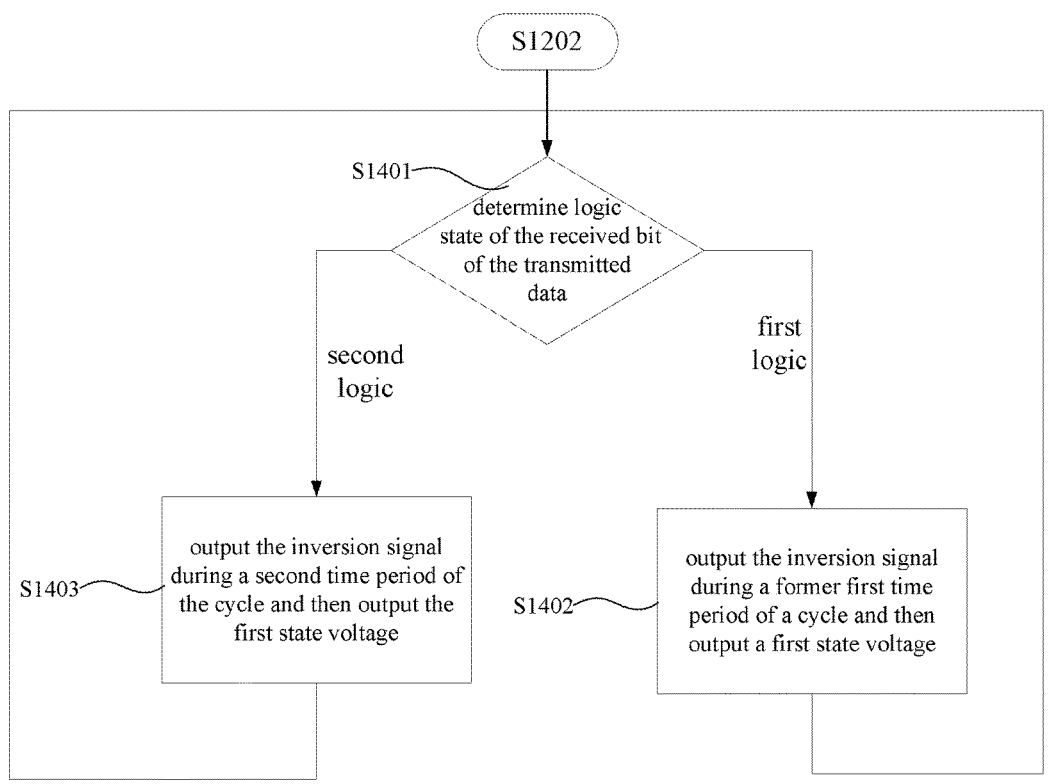
FIG. 14 shows the sub-steps of the step S1203 of the flowchart of a touch-control communication method by PWM (pulse width modulation) encoding according to a preferred embodiment of the present invention.

The abovementioned embodiment adopts Manchester encoding to perform the step S1203. FIG. 14 shows the sub-steps of the step S1203 of the flowchart of a touch-control communication method by PWM (pulse width modulation) encoding according to a preferred embodiment of the present invention. Referring to FIG. 14, the step S1203 includes the steps as follows.

In step S1401, it is determined the logic state of the received bit of the transmitted data. When the transmitted data is first logic, the step S1402 is performed. When the transmitted data is second logic, the step S1403 is performed. Similarly, the designer can selectively design that the first logic is logic 1 and the second logic is logic 0 or the first logic is logic 0 and the second logic is logic 1. The detail description is omitted.

In step S1402, when the transmitted data is a first logic, outputting the inversion signal during a former first time period of a cycle and then outputting a first state voltage.

In step S1403, when the transmitted data is a second logic, outputting the inversion signal during a second time period of the cycle and then outputting the first state voltage.

In this embodiment, the first time period is not equal to the second time period. Thus, the length of time can be used for dividing the logic state.

Figure 15:
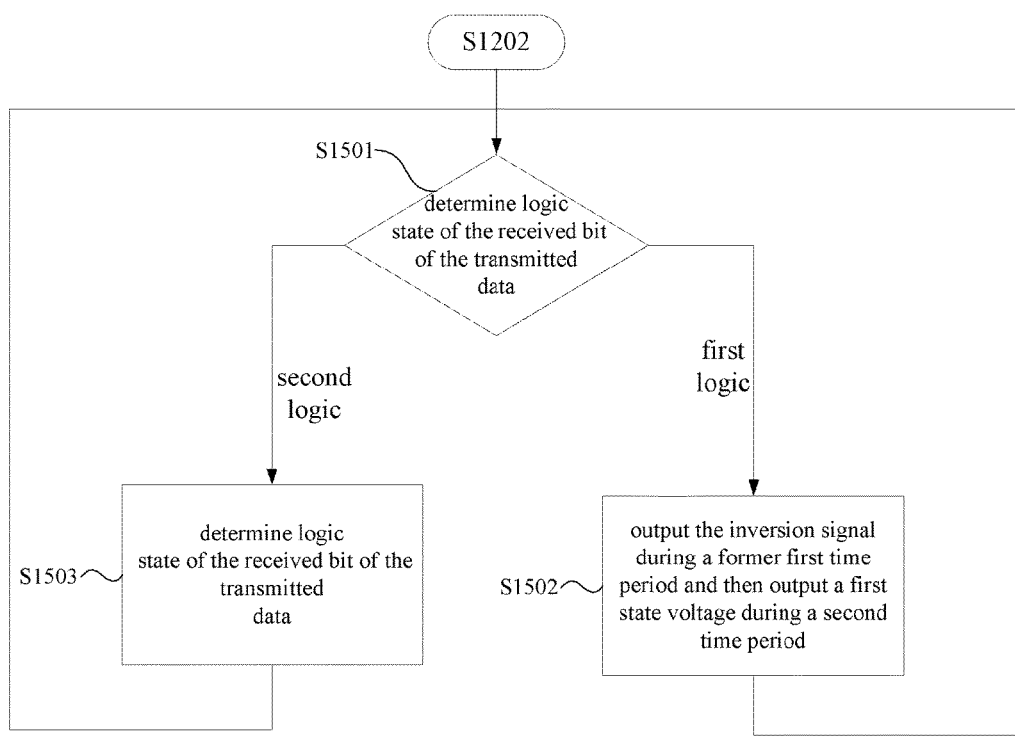
FIG. 15 shows the sub-steps of the step S1203 of the flowchart of a touch-control communication method by PPM encoding according to a preferred embodiment of the present invention.

FIG. 15 shows the sub-steps of the step S1203 of the flowchart of a touch-control communication method by PPM encoding according to a preferred embodiment of the present invention. Referring to FIG. 15, the step S1203 includes the steps as follows.

In step S1501, it is determined the logic state of the received bit of the transmitted data. When the transmitted data is first logic, the step S1502 is performed. When the transmitted data is second logic, the step S1503 is performed. Similarly, the designer can selectively design that the first logic is logic 1 and the second logic is logic 0 or the first logic is logic 0 and the second logic is logic 1. The detail description is omitted.

In step S1502, when the transmitted data is a first logic, outputting the inversion signal during a former first time period and then outputting a first state voltage during a second time period.

In step S1503, when the transmitted data is a second logic, outputting the inversion signal during a former third time period and then outputting the first state voltage during the second time period, wherein the first time period is not equal to the third time period.

Figure 16:
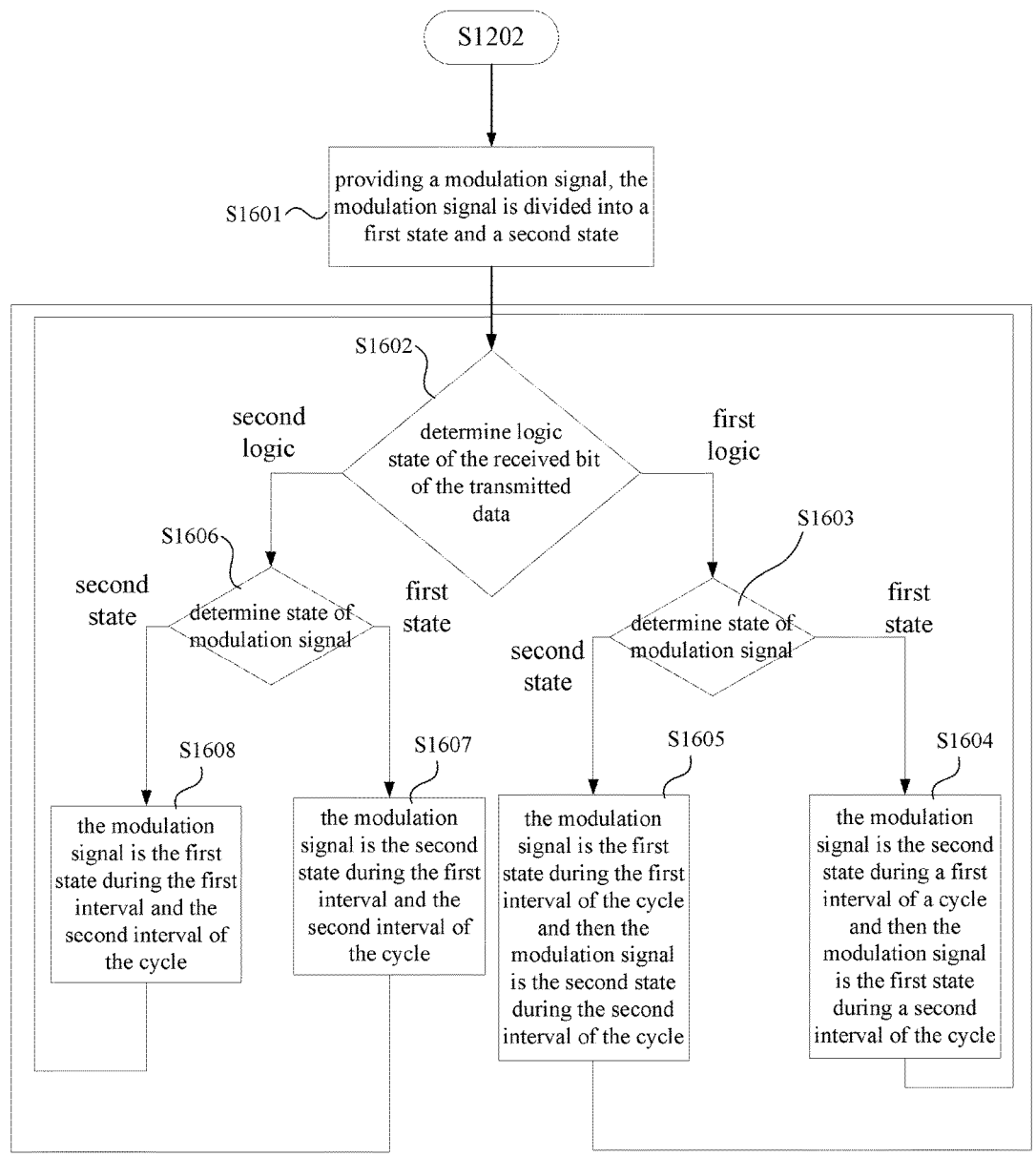
FIG. 16 shows the sub-steps of the step S1203 of the flowchart of a touch-control communication method by Bi-Phase encoding according to a preferred embodiment of the present invention.

FIG. 16 shows the sub-steps of the step S1203 of the flowchart of a touch-control communication method by Bi-Phase encoding according to a preferred embodiment of the present invention. Referring to FIG. 16, the step S1203 includes the steps as follows.

In step S1601, a modulation signal is provided, wherein the modulation signal has a first state and a second state. The first state and the second state respectively correspond to the output of the inversion signal INVRF and the non-output of the inversion signal INVRF. In other words, the first state can be seen as an event that the projective capacitive touch panel 203 is touched, and the second state can be seen as an event that the projective capacitive touch panel 203 is not touched. However, people having ordinary skill in the art should know that the designer can selectively design that the first state is that the projective capacitive touch panel 203 is not touched, and the second state is that the projective capacitive touch panel 203 is touched. The detail description is omitted.

In step S1602, it is determined the logic state of the received bit of the transmitted data. When the transmitted data is first logic, the step S1603 is performed. When the transmitted data is second logic, the step S1606 is performed. Similarly, the designer can selectively design that the first logic is logic 1 and the second logic is logic 0 or the first logic is logic 0 and the second logic is logic 1. The detail description is omitted.

In step S1603, when the transmitted data is first logic, it is determined the state of the modulation signal. When the modulation signal is the first state, the step S1604 is performed. When the modulation signal is the second state, the step S1605 is performed.

In step S1604, when the transmitted data is a first logic and the modulation signal is the first state, the modulation signal is the second state during a first interval of a cycle and then the modulation signal is the first state during a second interval of the cycle.

In step S1605, when the transmitted data is the first logic and the modulation signal is the second state, the modulation signal is the first stage during the first interval of the cycle and then the modulation signal is the second state during the second interval of the cycle.

In step S1606, when the transmitted data is second logic, it is determined the state of the modulation signal. When the modulation signal is the first state, the step S1607 is performed. When the modulation signal is the second state, the step S1608 is performed.

In step S1607, when the transmitted data is the second logic and the modulation signal is the first state, the modulation signal is the second state during the first interval and the second interval of the cycle.

In step S1608, when the transmitted data is the second logic and the modulation signal is the second state, the modulation signal is the first state during the first interval and the second interval of the cycle.

To sum up, the spirit of the present invention is using an antenna to receive a touch-control radio frequency detection signal output by a projective capacitive touch panel to determine whether or not to invert the touch-control radio frequency detection signal according to the logic state of data and then send back the inverted touch-control radio frequency detection signal to the projective capacitive touch panel through the antenna, so that the projective capacitive touch panel senses a touch point. Therefore, the projective capacitive touch panel can detect the presence or absence of the touch point, thereby determining the logic state of the data transmitted by the projective capacitive touch panel.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A touch-control communication system, comprising:
    a mobile device, comprising:
        a projective capacitive touch panel, wherein the projective capacitive touch panel outputs a touch-control radio frequency detection signal when detecting touch; and
    a data transmission device, comprising:
        a signal receiving antenna, used to receive the touch-control radio frequency detection signal;
        a signal inverting circuit, comprising an input end and an output end, wherein the input end of the signal inverting circuit is coupled to the signal receiving antenna to receive the touch-control radio frequency detection signal so that the signal inverting circuit inverts the received touch-control radio frequency detection signal and outputs an inversion signal;
        a signal modulating circuit, comprising an input end and an output end, wherein the input end of the signal modulating circuit is coupled to the output end of the signal inverting circuit to receive the inversion signal and the signal modulating circuit outputs a modulation signal according to a transmitted data and the inversion signal;
        a signal amplifying circuit, comprising an input end and an output end, wherein the input end of the signal amplifying circuit is coupled to the output end of the signal modulating circuit so that the signal amplifying circuit amplifies the modulation signal output by the signal modulating circuit to output an amplification signal; and
        a signal output antenna, coupled to the output end of the signal amplifying circuit to output the amplification signal,
    wherein the signal modulating circuit receives the transmitted data and determines whether or not to output the inversion signal to the signal amplifying circuit according to the transmitted data so that the projective capacitive touch panel detects whether or not a touch point exists as a logic state of the transmitted data and sends the transmitted data to the mobile device.

2. The touch-control communication system as claimed in claim 1, further comprising:
    a pre-amplifier circuit, comprising an input end and an output end, wherein the input end of the pre-amplifier circuit coupled to the signal receiving antenna to receive the touch-control radio frequency detection signal and pre-amplify the touch-control radio frequency detection signal.

3. The touch-control communication system as claimed in claim 2, further comprising:
    a filter circuit, comprising an input end and an output end, wherein the input end of the filter circuit is coupled to the output end of the pre-amplifier circuit, the filter circuit being used to filter the pre-amplified touch-control radio frequency detection signal.

4. The touch-control communication system as claimed in claim 2, the pre-amplifier circuit comprising:
    an emitter follower, comprising an input end and an output end, wherein the input end of the emitter follower is coupled to the signal receiving antenna to do impedance matching with the signal receiving antenna; and
    a common emitter amplifier, comprising an input end and an output end, wherein the input end of the common emitter amplifier is coupled to the output end of the emitter follower.

5. The touch-control communication system as claimed in claim 2, further comprising:
    an enabling circuit, comprising an input end and an output end, wherein the input end of the enabling circuit is coupled to the output end of the pre-amplifier circuit to capture a packet of messages from the output end of the pre-amplifier circuit and the output end of the enabling circuit is used to control whether or not the signal inverting circuit, the signal modulating circuit, and the signal amplifying circuit are operating, wherein when the enabling circuit captures the packet, the enabling circuit starts the signal inverting circuit, the signal modulating circuit, and the signal amplifying circuit and when the enabling circuit does not capture the packet, the enabling circuit turns off the signal inverting circuit, the signal modulating circuit, and the signal amplifying circuit to stop their operation.

6. The touch-control communication system as claimed in claim 1, the signal amplifying circuit comprising:
    an inverter, comprising an input end and an output end, wherein the input end of the inverter is coupled to the output end of the signal modulating circuit;
    a high-side switch, comprising a first end, a second end, and a control end, wherein the first end of the high-side switch is coupled to a power voltage and the control end of the high-side switch is coupled to the output end of the inverter;

a low-side switch, comprising a first end, a second end, and a control end, wherein the first end of the low-side switch is coupled to the second end of the high-side switch, the second end of the low-side switch coupled to a common voltage, the control end of the low-side switch coupled to the input end of the inverter;

a resonant circuit, comprising an input end and an output end, wherein the input end of the resonant circuit is coupled to the second end of the high-side switch, the output end of the resonant circuit coupled to the signal output antenna to output the amplification signal.

7. The touch-control communication system as claimed in claim 6, the resonant circuit comprising:

a quality factor resistance, comprising a first end and a second end, the first end of the quality factor resistance coupled to the input end of the resonant circuit;

a resonant inductance, comprising a first end and a second end, wherein the first end of the resonant inductance is coupled to the second end of the quality factor resistance, and the second end of the resonant inductance is coupled to the output end of the resonant circuit; and a resonant capacitance, comprising a first end and a second end, wherein the first end of the resonant capacitance is coupled to the second end of the resonant inductance, and the second end of the resonant capacitance is coupled to the common voltage.

8. The touch-control communication system as claimed as claim 1, the signal amplifying circuit comprising:

a boost power supplier, comprising an input end and an output end, wherein the input end of the boost power supplier receives a power voltage, and the output end of the boost power supplier outputs a boost voltage, the boost voltage larger than the power voltage;

an output stage amplifier, comprising an input end, an output end, and a power supply end, wherein the power supply end of the output stage amplifier is coupled to the output end of the boost power supplier to receive the boost voltage, and the input end of the output stage amplifier is coupled to the output end of the signal modulating circuit, the output end of the output stage amplifier coupled to the signal output antenna.

9. The touch-control communication system as claimed in claim 1, wherein when the transmitted data is a first logic, the signal modulating circuit outputs the inversion signal during a first interval of a cycle and the signal modulating circuit outputs a first state voltage during a second interval of the cycle; and when the transmitted data is a second logic, the signal modulating circuit outputs the first state voltage during the first interval of the cycle and the signal modulating circuit outputs the inversion signal during the second interval of the cycle, the first interval and the second interval being the cycle.

10. The touch-control communication system as claimed in claim 1, wherein when the transmitted data is a first logic, the signal modulating circuit outputs the inversion signal during a former first time period of a cycle and then outputs a first state voltage; and when the transmitted data is a second logic, the signal modulating circuit outputs the inversion signal during a second time period of the cycle and then outputs the first state voltage, the first time period not equal to the second time period.

11. The touch-control communication system as claimed in claim 1, wherein when the transmitted data is a first logic, the signal modulating circuit outputs the inversion signal during a former first time period and then outputs a first state voltage during a second time period; and when the transmitted data is a second logic, the signal modulating circuit outputs the inversion signal during a former third time period and then outputs the first state voltage during the second time period, wherein the first time period is not equal to the third time period.

12. The touch-control communication system as claimed in claim 1, wherein the modulation signal has a first state and a second state, wherein when the transmitted data is a first logic and the modulation signal is the first state, the modulation signal is the second state during a first interval of a cycle and then the modulation signal is the first state during a second interval of the cycle;

when the transmitted data is the first logic and the modulation signal is the second state, the modulation signal is the first state during the first interval of the cycle and then the modulation signal is the second state during the second interval of the cycle;

when the transmitted data is the second logic and the modulation signal is the first state, the modulation signal is the second state during the first interval and the second interval of the cycle; and when the transmitted data is the second logic and the modulation signal is the second state, the modulation signal is the first state during the first interval and the second interval of the cycle, the first interval and the second interval being the cycle, the first state being "the signal modulating circuit outputting the inversion signal" and the second state being "the signal modulating circuit outputting the first state voltage".

13. A touch-control communication method, for transmitting a transmitted data of a data transmission device to a mobile device through a touch media, wherein the mobile device comprises a projective capacitive touch panel for sensing a touch event, wherein the touch-control communication method comprises:

acquiring a touch-control radio frequency detection signal from the projective capacitive touch panel;

inversely amplifying the touch-control radio frequency detection signal to obtain an inversion signal;

determining whether or not the inversion signal is output to the projective capacitive touch panel according to the transmitted data, so that the projective capacitive touch panel detects whether or not a touch point exists as a logic state of the transmitted data and sends the transmitted data to the mobile device.

14. The touch-control communication method as claimed in claim 13, wherein determining whether or not the inversion signal is output to the projective capacitive touch panel according to the transmitted data, so that the projective capacitive touch panel detects whether or not the touch point exists as the logic state of the transmitted data and sends the transmitted data to the mobile device comprises:

when the transmitted data is a first logic, outputting the inversion signal during a first interval of a cycle and outputting a first state voltage during a second interval of the cycle, when the transmitted data is a second logic, outputting the first state voltage during the first interval of the cycle and outputting the inversion signal during the second interval of the cycle, wherein the first interval plus the second interval equals the cycle.

15. The touch-control communication method as claimed in claim 13, wherein determining whether or not the inversion signal is output to the projective capacitive touch panel according to the transmitted data, so that the projective capacitive touch panel detects whether or not the touch point exists as the logic state of the transmitted data and sends the transmitted data to the mobile device comprises:
- when the transmitted data is a first logic, outputting the inversion signal during a former first time period of a cycle and then outputting a first state voltage; and
- when the transmitted data is a second logic, outputting the inversion signal during a second time period of the cycle and then outputting the first state voltage,
- wherein the first time period is not equal to the second time period.

16. The touch-control communication method as claimed in claim 13, wherein determining whether or not the inversion signal is output to the projective capacitive touch panel according to the transmitted data, so that the projective capacitive touch panel detects whether or not the touch point exists as the logic state of the transmitted data and sends the transmitted data to the mobile device comprises:
- when the transmitted data is a first logic, outputting the inversion signal during a former first time period and then outputting a first state voltage during a second time period; and
- when the transmitted data is a second logic, outputting the inversion signal during a former third time period and then outputting the first state voltage during the second time period,
- wherein the first time period is not equal to the third time period.

17. The touch-control communication method as claimed in claim 13, wherein determining whether or not the inversion signal is output to the projective capacitive touch panel according to the transmitted data, so that the projective capacitive touch panel detects whether or not the touch point exists as the logic state of the transmitted data and sends the transmitted data to the mobile device comprises:
- providing a modulation signal, wherein the modulation signal has a first state and a second state,
- wherein, when the transmitted data is a first logic and the modulation signal is the first state, the modulation signal is the second state during a first interval of a cycle and then the modulation signal is the first state during a second interval of the cycle;
- wherein, when the transmitted data is the first logic and the modulation signal is the second state, the modulation signal is the first state during the first interval of the cycle and then the modulation signal is the second state during the second interval of the cycle;
- wherein, when the transmitted data is the second logic and the modulation signal is the first state, the modulation signal is the second state during the first interval and the second interval of the cycle; and
- wherein, when the transmitted data is the second logic and the modulation signal is the second state, the modulation signal is the first state during the first interval and the second interval of the cycle,
- wherein the first interval plus the second interval equals the cycle,
- wherein the first state is "the signal modulating circuit outputting the inversion signal" and the second state is "the signal modulating circuit outputting the first state voltage".

* * * * *